United States Patent
Wood et al.

(10) Patent No.: US 8,305,896 B2
(45) Date of Patent: Nov. 6, 2012

(54) SELECTIVE PERFORMANCE ENHANCEMENT OF TRAFFIC FLOWS

(75) Inventors: Lloyd Harvey Wood, Middlesex (GB); Kenneth Durazzo, San Ramon, CA (US); Yu-Cheng Shao, San Jose, CA (US); Daniel John Floreani, Adelaide (AU)

(73) Assignee: Cisco Technology, Inc., San Jose, CA (US)

( * ) Notice: Subject to any disclaimer, the term of this patent is extended or adjusted under 35 U.S.C. 154(b) by 258 days.

(21) Appl. No.: 11/931,870

(22) Filed: Oct. 31, 2007

(65) Prior Publication Data

US 2009/0109849 A1    Apr. 30, 2009

(51) Int. Cl.
*G01R 31/08*    (2006.01)

(52) U.S. Cl. .................... 370/235; 370/230; 370/352

(58) Field of Classification Search ................ None
See application file for complete search history.

(56) References Cited

U.S. PATENT DOCUMENTS

| | | | | | |
|---|---|---|---|---|---|
| 5,926,459 | A * | 7/1999 | Lyles et al. | ............. | 370/230 |
| 5,978,359 | A * | 11/1999 | Caldara et al. | ............. | 370/236 |
| 6,212,162 | B1 * | 4/2001 | Horlin | ............. | 370/229 |
| 6,320,845 | B1 * | 11/2001 | Davie | ............. | 370/230 |
| 6,327,364 | B1 * | 12/2001 | Shaffer et al. | ............. | 379/265.02 |
| 6,327,677 | B1 * | 12/2001 | Garg et al. | ............. | 714/37 |
| 6,515,963 | B1 * | 2/2003 | Bechtolsheim et al. | ...... | 370/229 |
| 6,570,883 | B1 * | 5/2003 | Wong | ............. | 370/412 |
| 6,937,560 | B2 * | 8/2005 | Enns et al. | ............. | 370/229 |
| 6,959,002 | B2 * | 10/2005 | Wynne et al. | ............. | 370/412 |
| 7,346,000 | B1 * | 3/2008 | Srinivasan et al. | ............. | 370/235 |
| 7,359,326 | B1 * | 4/2008 | Harper et al. | ............. | 370/235 |
| 7,389,533 | B2 * | 6/2008 | Bartlett et al. | ............. | 726/15 |
| 7,398,552 | B2 * | 7/2008 | Pardee et al. | ............. | 726/15 |
| 7,453,804 | B1 * | 11/2008 | Feroz et al. | ............. | 370/230 |
| 7,478,161 | B2 * | 1/2009 | Bernet et al. | ............. | 709/228 |
| 7,486,621 | B2 * | 2/2009 | Bessis et al. | ............. | 370/236 |
| 7,543,052 | B1 * | 6/2009 | Cesa Klein | ............. | 709/224 |
| 7,564,790 | B2 * | 7/2009 | Burns et al. | ............. | 370/235 |
| 7,760,644 | B2 * | 7/2010 | Bader | ............. | 370/235 |
| 2001/0040899 | A1 * | 11/2001 | Carter et al. | ............. | 370/477 |
| 2002/0059408 | A1 * | 5/2002 | Pattabhiraman et al. | ..... | 709/223 |
| 2002/0071436 | A1 * | 6/2002 | Border et al. | ............. | 370/395.32 |
| 2003/0123393 | A1 * | 7/2003 | Feuerstraeter et al. | ....... | 370/235 |
| 2003/0123481 | A1 * | 7/2003 | Neale et al. | ............. | 370/466 |

(Continued)

OTHER PUBLICATIONS

Shacham, et al., IP Payload Compression Protocol (IPComp), Network Working Group, Dec. 1998, pp. 1-10, http://www.ietf.org/rfc/rfc2393.txt.

(Continued)

*Primary Examiner* — Ayaz Sheikh
*Assistant Examiner* — Faiyazkhan Ghafoerkhan
(74) *Attorney, Agent, or Firm* — Tucker Ellis LLP

(57) ABSTRACT

In an example embodiment, a method for selective performance enhancement of traffic flows, such as a Transmission Control Protocol (TCP) flow, on devices where enhancement of a limited number of concurrent flows is supported, or where a limited number of TCP accelerated or IP (Internet Protocol) compressed flows are supported. Flows are selected to be enhanced, accelerated or compressed based on configured priorities, including but not limited to type of the flow, importance of the flow, and availability of resources to enhance, accelerate or compress the flow. For example, a high-priority TCP session is accelerated for the lifetime of the session, while a low-priority TCP session is accelerated while there are available resources for the low-priority flow.

9 Claims, 3 Drawing Sheets

U.S. PATENT DOCUMENTS

| | | | | |
|---|---|---|---|---|
| 2003/0161263 A1* | 8/2003 | Enns et al. | | 370/229 |
| 2003/0169688 A1* | 9/2003 | Mott | | 370/230 |
| 2003/0174649 A1* | 9/2003 | Shankar et al. | | 370/235 |
| 2003/0177396 A1* | 9/2003 | Bartlett et al. | | 713/201 |
| 2004/0174816 A1* | 9/2004 | Stewart et al. | | 370/235 |
| 2004/0267897 A1* | 12/2004 | Hill et al. | | 709/217 |
| 2005/0063701 A1* | 3/2005 | Ovadia et al. | | 398/45 |
| 2006/0171311 A1 | 8/2006 | Naik et al. | | |
| 2007/0014275 A1* | 1/2007 | Bettink et al. | | 370/351 |
| 2007/0195814 A1* | 8/2007 | Barrie et al. | | 370/463 |
| 2008/0192632 A1* | 8/2008 | Bader | | 370/230.1 |

OTHER PUBLICATIONS

Border, et al., RfC 3135—Performance Enhancing Proxie Intended to Mitigate Link-Related Degradations, Jun. 2001, http://www.faqs.org/rfcs/rfc3135.html.

Rate Based Satellite Control Protocol, Copyright © 2004 Cisco Systems, Inc., pp. 1-34.

Shacham, et al., RFC 3173—IP Payload Compression Protocol (IPComp), Internet RFC/STD/FYI/BCP Archives, Sep. 2001, http://www.faqs.org/rfcs/rfc3173.html.

* cited by examiner

SELECTIVE PERFORMANCE ENHANCEMENT OF TRAFFIC FLOWS

TECHNICAL FIELD

This application is generally related to data stream processing.

BACKGROUND

Traffic flows, such as Transmission Control Protocol (TCP) sessions, use computing resources such as central processing unit "CPU" processing power, memory and link bandwidth. For example, traffic flows may be implemented on links utilizing a low end router (e.g. a router with limited central processing unit "CPU" or memory capacity) and/or low bandwidth (e.g. satellite) link. This limits the number of traffic flows that can be implemented on a link as well as the performance of the link and the performance of the individual traffic flows.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus, comprising a router having one or more input ports and an output port, and routing logic for controlling the processing of a traffic flow received at an input port operatively coupled to the router and configured to determine an available resource of the router. The routing logic is configured to invoke acceleration logic to selectively accelerate the traffic flow based on the available resource.

In accordance with an example embodiment, there is disclosed herein a method comprising receiving a traffic flow, determining a priority level for the traffic flow and determining an amount available of a resource. The method further comprises selectively accelerating the traffic flow responsive to the traffic flow having a predetermined priority level and the amount available of the resource is sufficient to process the accelerated traffic flow.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 3:
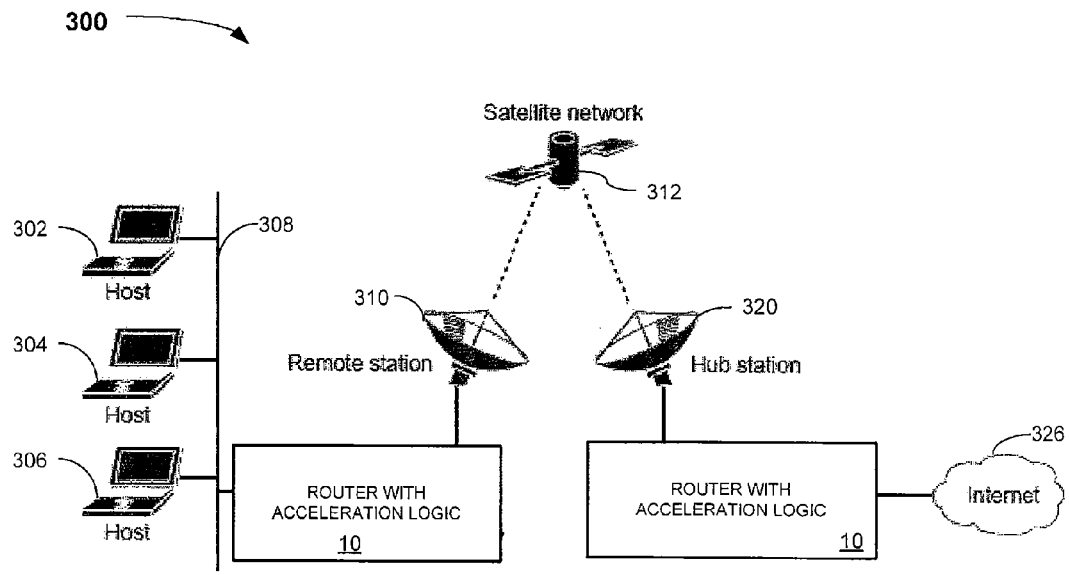
FIG. 3 illustrates an example communication system employing routers with acceleration logic.

This description provides examples not intended to limit the scope of the appended claims. The figures generally indicate the features of the examples, where it is understood and appreciated that like reference numerals are used to refer to like elements.

Described herein in an example embodiment is an implementation in acceleration logic of TCP PEP (Transmission Control Protocol Performance Enhancing Proxies) or other methods such as compression to selectively enhance the performance of traffic flows. The functionality of the example embodiments described herein are suitable for any type of routing device or for a dedicated TCP PEP device. Moreover, the functionality described herein may be implemented in software and is suitable to enhance traffic flows for a low-end device, e.g. a device with limited CPU (central processing unit) processing power and with limited memory available to store and handle per-TCP flow state which can support PEPping for a limited number of TCP sessions. The example embodiments described herein are also suitably adapted for communications links with limited bandwidth. An example embodiment described herein provides the ability to preferentially accelerate certain TCP sessions from known ports/addresses. As used herein, accelerated refers to any additional (enhanced) processing of a traffic flow, or the provisioning of additional resources to a traffic flow. For example, accelerated processing can include, but is not limited to, TCP window scaling, buffering and changing advertised receiver windows, compression (e.g. Internet Protocol Compress or "IPComp"). An access control list (ACL) or similar type of interface can be used to configure acceleration methods for preferred traffic flows. For example, a non-preferred but currently accelerated TCP session can be transitioned to a non-accelerated 'normal' session when an ACL-specified preferred session begins, making room in the limited pool for the preferred TCP session. Alternatively, other demands on the router may require that the number of supported sessions be scaled back, and non-preferred TCP sessions stop being accelerated.

For example, a low-end router with limited CPU/processor power and available memory can be used with low-rate links (e.g. a wireless satellite link running at less than 512 kbps). The low end router may have sufficient resources to provide TCP PEP acceleration for 20-40 concurrent TCP sessions. The number-of-concurrent-sessions limit may be fixed or set depending on estimates of available memory/processor cycles, with some buffer/CPU margin to spare. Example embodiments described herein are suitably adaptable to enable the router to selectively enhance traffic flows when adequate resources are available.

Example embodiments described herein could be useful on a router supporting a small stub network hanging off the network, (e.g. 20-40 sessions may well be sufficient for all traffic fanning out over the low-rate link to various destinations in the Internet). This low number of parallel sessions is not unusual on long-delay satellite links, where users tend to perform tasks in sequence rather than compete with themselves.

Hosts can generate multiple concurrent TCP sessions, therefore, more concurrent sessions than a router can PEP/compress can be expected. Given a limited ability to support PEP acceleration of a limited number of TCP sessions, if there are more TCP sessions than can be supported, the router determines which sessions should be prioritized, which depends on the applications being used and the mix of traffic being generated, which is known when the ACLs are configured on the router. Some applications (e.g. NFS (Network File Services), web browsing) benefit more from TCP acceleration than other applications (e.g. Secure Shell (SSH) file transfer protocol, telnet), which can be configured. Also, some flows (e.g. text) compress better than other flows (e.g. already-compressed images), and this can also be reflected in a configuration. In both cases the configuration can rely on Quality of Service (QoS) values (e.g. diffserv precedence) set by the endhosts as an indicator of importance of the flow.

Initial negotiation between PEP endpoints determines the number of sessions and features that can be supported through the PEPs. A session table can be employed to limit sessions based upon available CPU capabilities. For example, a software client will allow up to the maximum number of sessions supported given available CPU resources.

In an example embodiment, to facilitate performance enhancing, TCP sessions can be described as High Priority, Low Priority, or Never-accelerated. Flows begin as non-accelerated, and are then prioritised as high, low, or never accelerated according to the session descriptions. The session descriptions may be configured into a router using an ACL MQC (Modular QoS Command Line Interface).

High Priority specifies traffic flows that are always accelerated, such as important TCP sessions. The PEP can fully terminate and negotiate initial SYN/ACK options for a high-priority TCP session with its peer when the connection is opened. The TCP session is accelerated for its entire lifetime, and then the PEP tears down the session when the TCP connection closes.

Low Priority designates a traffic flow session that can be accelerated, such as a less important TCP session, but which must give way to high-priority sessions when a high-priority session starts, if there is no space in the available pool of resources (e.g. CPU power, memory and/or bandwidth) for both sessions. Low-priority TCP sessions have acceleration options that do not include SYN startup negotiation, so they can be transitioned back to non-accelerated sessions easily if the pool must support a high-priority session instead. If a high-priority session ends, returning sufficient resources to the pool, a low-priority session can be chosen to be transitioned (back) to accelerated.

Never-accelerated is for traffic flow sessions that are deliberately not accelerated, as the traffic is set as low priority in the router configuration. For example, the default for PEP acceleration behavior can be set to turn all PEPs off, e.g. the equivalent to a 'deny all' ACL configuration.

For example, TCP window scaling (shifting the bits describing the window size to the right to increase window size and descriptions of window size by order of binary magnitude), which is negotiated via SYN-ACK, is an example of something that can be done by a PEP on high-priority TCP sessions for the lifetime of the session. This is because once a window size is set, it cannot be changed down once the session has started, and the endhosts will believe and use the window scale setting for the whole of the TCP session.

Buffering and changing advertised receiver windows without window scaling (e.g. a 4K TCP receiver window can be advertised via the PEP as up to 64K, with the PEP receiver buffering the packets and sending them out to the receiver over time) is something that can be altered during an active session. A spoofed receiver window value can be returned to the end-host actual receiver window value when a low-priority session is removed from the pool and continues non-accelerated, to make room in the pool for a high-priority session. This is an example of something that can be implemented for both high- and low-priority sessions. Another example of selective processing that can be implemented on both high- and low-priority sessions is TCP acknowledgment (ACK) splitting. TCP ACK splitting increases the number of ACKS to a sender from the sender's PEP and can increase the sender's congestion window. ACK splitting uses very little per-flow state and can be turned off without adversely affecting communications, so a low-priority TCP session being accelerated by ACK splitting can be easily transitioned to non-accelerated.

Similarly, implementing IPComp per-packet IP compression via the well-known 'deflate' compression algorithm, or another algorithm, is compute-intensive, and only a limited number of TCP/UDP/IP (Transmission Control Protocol/Uniform Datagram Protocol/Internet Protocol) traffic flows may be supported and have their packets compressed (e.g. in software) at any one time due to limits on available processing resources. IPComp does not have to be used for every packet, so removing low-priority IPComp'd sessions from the PEP pool and having the receiver PEP pass uncompressed packets straight through to the endhosts is straightforward to implement. However, passing through a previously IPComp'd flow as uncompressed uses more link bandwidth, which on a low-rate link may adversely affect parallel concurrent TCP flows using that link. This effect can be minimized by selecting which low-rate IPComp'd flow to stop compressing. For example, flows that do not compress well can be removed from the compression pool first. Flows can be selected based on statistics on past compression performance on each flow (e.g. a comparison of bytes in vs compressed bytes out is a good indicator of which flow can be passed through uncompressed). If a flow is not being compressed much, removing that flow from the compression pool will have little harmful effect, but will allow processing resources to be allocated more usefully.

Flows removed from the pool and then passed through untouched (uncompressed/unoptimised) can be tracked as non-accelerated 'null flows' with little overhead, and returned to the pool when processing resources are freed and it is possible to again use processing resources to compress them.

Figure 1:
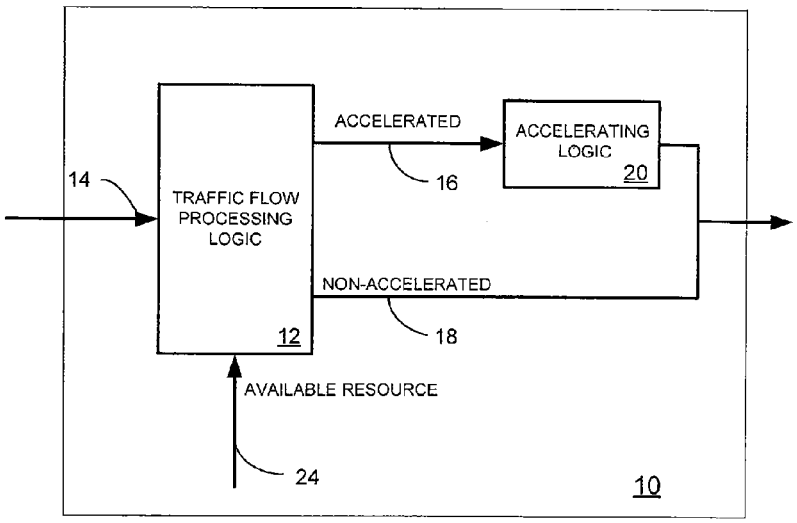
FIG. 1 is a functional block diagram of routing device configured to selectively enhance the performance of a traffic flow in accordance with an example embodiment.

FIG. 1 is a functional block diagram of routing device 10 configured to selectively enhance the performance of a traffic flow in accordance with an example embodiment. Routing device 10 comprises traffic flow processing logic 12 having an input 14 for receiving a traffic flow (for example a TCP stream). Traffic flow processing logic 12 selectively forwards the traffic flow to an accelerated path 16 or a non-accelerated path 18. Traffic flows forwarded on accelerated path 16 are processed by accelerating logic 20, which in an example embodiment can provide the functionality of a performance enhancing proxy, "PEP"). Although as illustrated accelerator logic 20 is illustrated as a separate component, this is merely for illustration, as in particular embodiments, accelerator logic 20 may be incorporated into traffic flow processing logic. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Traffic flow processing logic 12 is configured to determine properties of the traffic flow in selecting how to process, or treat, the traffic flow.

For example, if traffic flow processing logic 12 determines that a packet in a traffic flow coming in via input path 14 is a high priority (e.g. always accelerated) traffic flow, then traffic flow processing logic 12 routes all packets for the flow to accelerator 20 via output path 16.

For a high priority traffic flow, acceleration logic 20 can employ TCP window scaling (e.g. shifting the bits describing the window size to the right), which is negotiated during a SYN-ACK exchange. This can be done during TCP session setup, since the window size setting may not be changed once the session has started. In particular embodiments, acceleration logic 20 can employ other accelerating functions, such as buffering and changing advertised receiver windows, time delay, ACK splitting and/or compression (e.g. Ipcomp).

Similarly, if traffic flow processing logic 12 determines the traffic flow received on input path 14 is a non-accelerated (or never-accelerated) traffic flow (from configuration or from other means), the flow is always routed via output path 18. This may be useful for traffic flows that may not benefit from acceleration (e.g. images or other previously compressed files that would not benefit from further compression).

If traffic flow processing logic 12 determines the traffic flow is a low-priority flow, traffic flow processing logic 12 can selectively accelerate the low-priority traffic flow based on the availability of resources, such as CPU capacity, memory, and/or bandwidth. The low priority traffic flow can be routed to accelerator 20 via path 16 when being accelerated. The low priority traffic flow can be routed via the non-accelerated path 18, when not being accelerated. For example, as will be described in more detail herein in FIG. 2, if the router is processing a plurality of streams, and if there are sufficient resources available, the router can also accelerate the low-priority traffic flow. If a new (e.g. second) flow, which is high priority, starts and the available resources are no longer sufficient to support accelerating the low-priority traffic flow, the low-priority traffic flow is transitioned to a non-accelerated state. If sufficient resources become available later, for example the second flow ends, then traffic flow processing logic 12 can again accelerate the low-priority traffic flow. The low-priority traffic flow can be accelerated by any method; however, in particular embodiments the traffic flow is accelerated using techniques which can easily be transitioned to non-accelerated state (i.e. the low priority traffic flow does not have to have its session be re-initialized) such as buffering and changing advertised receiver window, ACK splitting, and/or compression which are described herein.

Figure 2:
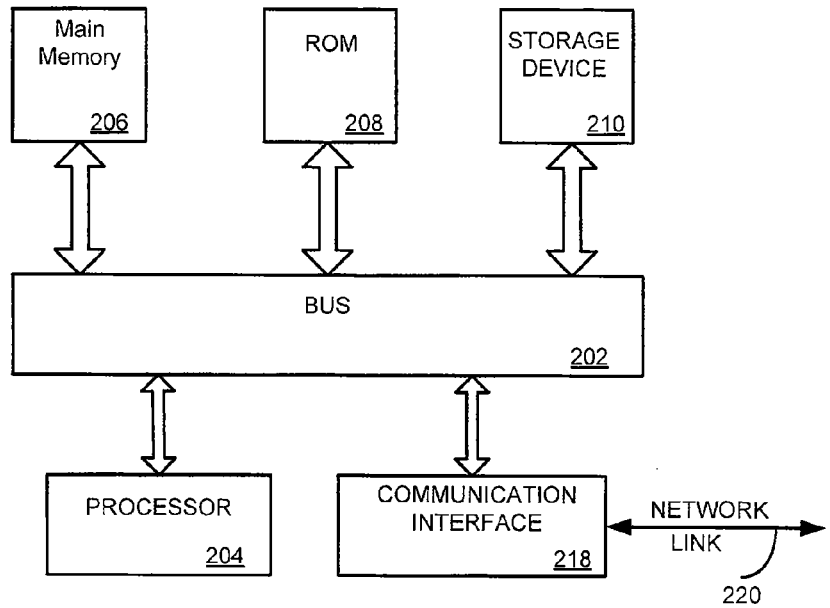
FIG. 2 is a block diagram of a computer system suitable for implementing an example embodiment.

FIG. 2 is a block diagram that illustrates a computer system 200 upon which an example embodiment may be implemented. For example, computer system 200 is suitable for implementing routing device 10 and/or accelerating logic 20. Computer system 200 includes a bus 202 or other communication mechanism for communicating information and a processor 204 coupled with bus 202 for processing information. Computer system 200 also includes a main memory 206, such as random access memory (RAM) or other dynamic storage device coupled to bus 202 for storing information and instructions to be executed by processor 204. Main memory 206 also may be used for storing a temporary variable or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions. In particular embodiments, computer system 200 comprises one of main memory 206 and storage device 210.

An aspect of the example embodiment is related to the use of computer system 200 for selecting accelerating a traffic flow. According to an example embodiment, selecting accelerating a traffic flow is provided by computer system 200 in response to processor 204 executing one or more sequences of one or more instructions contained in main memory 206. Such instructions may be read into main memory 206 from another computer-readable medium, such as storage device 210. Execution of the sequence of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 204 for execution. Such a medium may take many forms, including but not limited to non-volatile media, volatile media, and transmission media. Non-volatile media include for example optical or magnetic disks, such as storage device 210 or ROM 206. Volatile media include dynamic memory such as main memory 206. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 204 for execution. For example, the instructions may initially be borne on a magnetic disk of a remote computer. Transmission media include coaxial cables, copper wire and fiber optics, including the wires that comprise bus 202. Transmission media can also take the form of acoustic or light waves such as those generated during radio frequency (RF) and infrared (IR) data communications. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206 from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to an associated network (Not shown). For example, communications interface 218 may be an Ethernet Interface and Network Link 220 is coupled computer system 200 to an Ethernet network. As another example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic, or optical signals that carry digital data streams representing various types of information.

FIG. 3 illustrates an example communication system 300. System 300 comprises hosts 302, 304, 306 communicating on network 308 to a first router with acceleration logic 10. As described herein supra (see FIG. 1), router with acceleration logic 10 comprise traffic flow processing logic configured to accelerate selected traffic flows. Flows from network 308 are communicated to the Network 326 via first router 10, satellite transceiver 310, satellite 312, satellite transceiver 320 and second router 10. Network 326 can be a private network or a public network such as the Internet.

In an example embodiment, first and second routers 10 can be configured to accelerate traffic flows by holding copies of frames due for transmission. Delay time increases the Round Trip Time (RTT) at the host end and allows time to re-transmit lost TCP frames or other protocol frames. If the re-transmission is successful, it prevents lost frame events from reaching an end host where congestion procedures would be enabled. In some cases, re-transmission can be completed without inserting a delay.

In an example embodiment, performance enhancements can be realized by using acknowledgment (ACK) splitting where a number of addition TCP ACKs are generated for each TCP ACK received. TCP will open a congestion window by one maximum transmission unit (MTU) for each TCP ACK received. Opening the congestion window increases available bandwidth.

In an example embodiment, window stuffing can be employed to buffer traffic so that the advertised window can be incremented up to the available satellite link bandwidth and/or the memory available in first router 10 and/or second router 10.

In an example embodiment, data compression (e.g. IPComp) can be employed to accelerate data flows. For example, if there is sufficient CPU/memory capacity, a low priority flow can be compressed. As capacity decreases, lower priority traffic flows can be sent uncompressed; however, uncompressed flows may increase the amount of link bandwidth used. First router 10 and/or second router 10 can be configured to determine which flows benefit the least from compression, and these flows can be transitioned from accelerated to non-accelerated before flows that benefit the most from compression.

If, while a low priority flow is non-accelerated, resources become available, e.g. a high priority traffic flow ends, the low priority flow can be transitioned to an accelerated flow. The low priority flow can be accelerated until resources are needed to process high priority flows, whereupon the low priority flow can be transitioned to a non-accelerated flow.

It should be noted in some embodiments acceleration may only be available at one end of the link. In such embodiments, some acceleration methods such as ack splitting and window spoofing can be employed.

Figure 4:
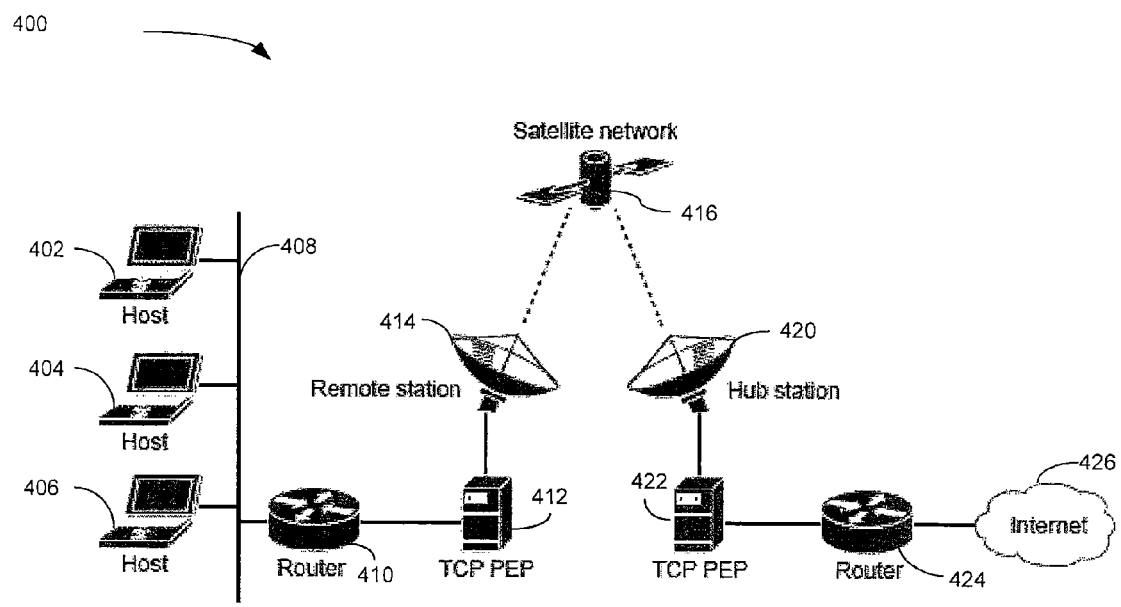
FIG. 4 illustrates an example communication system employing routers coupled to external TCP PEPs.

FIG. 4 illustrates an example communication system 400. System 400 comprises hosts 402, 404, 406 communicating on network 408 to router 410. Frames are sent to Internet 426 from hosts 402, 404, 406 through router 410, TCP 412, satellite transceiver 414, satellite 416 satellite transceiver 420, TCP PEP 422 and router 424. Frames destined to hosts 402, 404, 406 from Network 426 (which in the illustrated example is the Internet, but network 426 can be any private or public network) are routed through router 424, TCP PEP 422, satellite transceiver 420, satellite 416, satellite transceiver 414, TCP PEP 412, and router 410. At least one of TCP PEP 412 and 422 comprise traffic flow processing logic configured to selectively accelerate selected traffic flows.

In an example embodiment, TCP PEP 412 and TCP PEP 422 can be configured to accelerate traffic flows by holding frames due for transmission. Delay time increases the Round Trip Time (RTT) at the host end and allows time to re-transmit lost TCP frames or other protocol frames. If the re-transmission is successful, it prevents lost frame events from reaching an end host where congestion procedures would be enabled. In some cases, re-transmission can be completed without inserting a delay.

In an example embodiment, performance enhancements can be realized by using acknowledgment (ACK) splitting where a number of additional TCP ACKs are generated for each TCP ACK received. TCP will open a congestion window by one maximum transmission unit (MTU) for each TCP ACK received. Opening the congestion window increases available bandwidth.

In an example embodiment, window stuffing can be employed to buffer traffic so that the advertised window can be incremented up to the available satellite link bandwidth and/or the memory available in TCP PEP 412 and TCP PEP 422.

In an example embodiment, data compression (e.g. IPComp) can be employed to accelerate data flows. For example, if there is sufficient CPU/memory capacity, a low priority flow can be compressed. As capacity decreases, lower priority traffic flows can be sent uncompressed; however, uncompressed flows may increase the amount of link bandwidth used. TCP PEP 412 and/or TCP PEP 422 can be configured to determine which flows benefit the least from compression, and these flows can be transitioned from accelerated to non-accelerated before flows that benefit the most from compression.

If, while a low priority flow is non-accelerated, resources become available, e.g. a high priority traffic flow ends, the low priority flow can be transitioned to an accelerated flow. The low priority flow can be accelerated until resources are needed to process high priority flows, whereupon the low priority flow can be transitioned to a non-accelerated flow.

It should be noted in some embodiments acceleration may only be available at one end of the link. In such embodiments, some acceleration methods such as ack splitting and window spoofing can be employed.

It should also be noted that although FIGS. 3 and 4 illustrate embodiments of a satellite networking environment, this is merely for ease of illustration. Other embodiments employing any type of communication link between routers are suitably adaptable. For example, the principles described herein are suitably adapted to be employed on a peer-to-peer scenario or a network employing a dedicated leased transponder, and/or a private network not relaying frames to the Internet.

Figure 5:
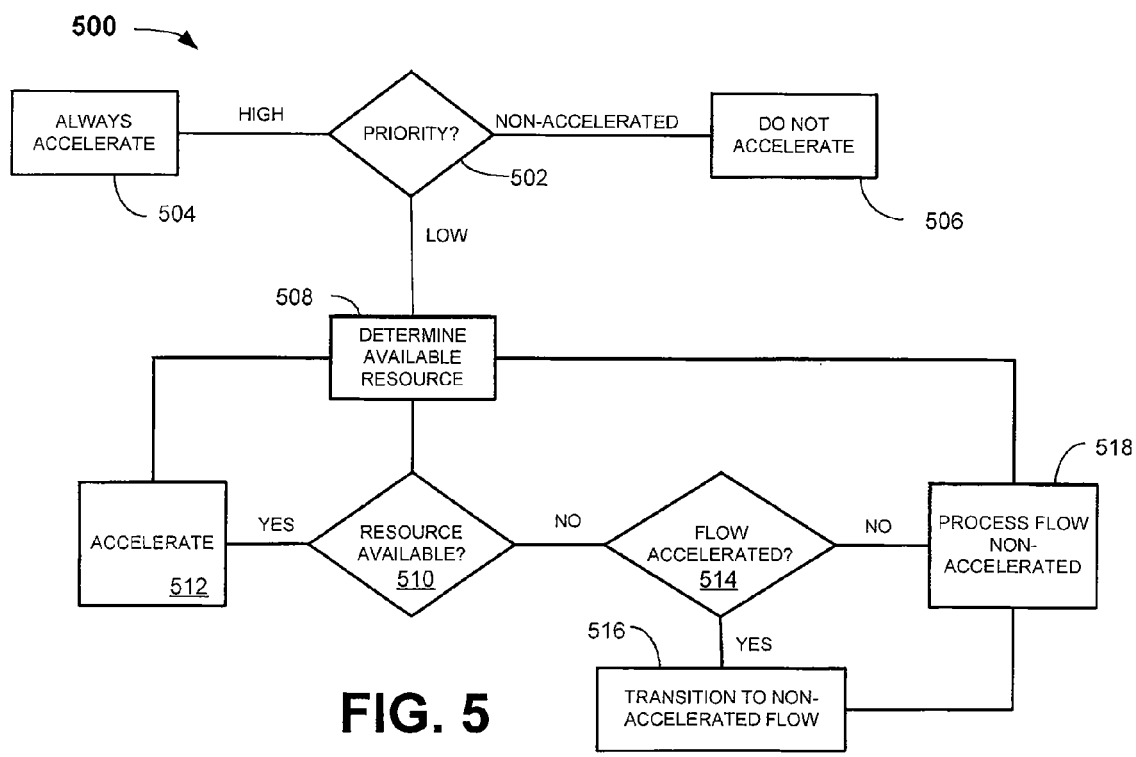
FIG. 5 is a block diagram illustrating an example of a methodology for selective performance enhancement of traffic flows.

In view of the foregoing structural and functional features described above, a methodology 500 in accordance with an example embodiment will be better appreciated with reference to FIG. 5. While, for purposes of simplicity of explanation, methodology 500 of FIG. 5 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an example embodiment. Methodology 500 described herein is suitably adapted to be implemented in hardware, software, or a combination thereof.

At 502, the priority of the flow is determined. The priority can be determined based on parameters used when the session was initiated, or from a user defined configuration, such as an ACL. If the traffic flow is a never-accelerated flow, then packets are not accelerated as illustrated at 506.

If the traffic flow is a low-priority flow, at 508, a determination is made whether there is a sufficient resource available to accelerate the low priority traffic flow. The resource can be one or more of available CPU capacity, available memory and available bandwidth.

If at 510 it is determined that the resource is available (YES), at 512 the flow is accelerated. If the flow was previously non-accelerated, the flow is transitioned to an accelerated flow. The flow can be accelerated using any accelerating technique which can be transitioned on and off during the lifetime of the traffic flow. For example, buffering and changing advertised receiver windows, ACK splitting and/or IP compression can be implemented for accelerating low priority flows.

If at 510, it is determined the resource is not available or insufficient (NO) the flow is not accelerated. If at 514 it is determined that the flow is currently being accelerated (YES), at 516 the flow is transitioned to a non-accelerated flow. After the flow is transitioned to non-accelerated, or if at 514 it is determined the flow is not currently accelerated (NO), the flow is processed as a non-accelerated flow as illustrated at 518.

Steps 508, 510, 512, 514, 516, 518 can be repeated any number of times during the lifetime of the low priority flow. For example, after a flow has been transitioned to a non-accelerated flow (e.g. at 516), if during a later iteration at 508 sufficient resources become available (for example a session for an accelerated flow completes and releases its resources), methodology 500 can proceed to 512 to accelerate the flow again. Likewise, after the flow has again been accelerated, if resources are needed for a new, accelerated traffic flow, the low priority flow can again be transitioned to a non-accelerated flow via 510, 514, 516.

If at 502 it is determined that the traffic flow is a high-priority flow (HIGH), at 520 a determination is made whether there is a sufficient resource available to accelerate the high-priority traffic flow. The resource can be for example any one or more of available CPU capacity, available memory and available bandwidth. If at 522 a determination is made that sufficient resources are available (YES), then as illustrated at 524 the traffic flow is accelerated. However, if at 522 a determination is made that sufficient resources are not available (NO), at 526 a determination is made as to whether there are any low priority flows that are currently being accelerated.

If at 526 a determination is made that there is a low priority flow being accelerated (YES), at 528 a low priority flow is transitioned to a non-accelerated flow to make resources available for the high priority flow. If more than one low priority flow is being accelerated, a low priority flow can be selected based on any criterion (for example the low priority flow using the most resources may be selected). Moreover, a plurality of low priority flows can be selected to make resources available for the high priority flow. Once the low priority flow (or flows) has been de-accelerated, at 524 the high priority flow is accelerated.

If at 526 there are no low priority flows that can be de-accelerated (NO) to provide resource for acceleration, the high priority flow cannot currently be accelerated, for example because all available resources are being expended on other high-priority flows. In an example embodiment, the availability of resources can be determined periodically, such as at 520. If sufficient resources become available, the high priority flow can later be transitioned to some form of accelerated flow. Because the flow was not accelerated during the initial session setup, acceleration techniques that employ initial session setup options such as TCP SYN may not be available. For example, 520 can be repeated periodically, or in a particular embodiment responsive to an event such as the termination of an accelerated flow. At 522, a determination is again made whether there are now sufficient resources to accelerate the flow. If sufficient resources have become available (YES), the flow is accelerated at 524; otherwise, 526, 528, 520 and 522 can be repeated.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a router having an input port and an output port, the router receiving at least one high priority traffic flow session and a plurality of low priority flow traffic flow sessions through the input port;
accelerating logic on the router configured to provide compression of selected traffic flow sessions received at the accelerating logic; and
routing logic for controlling the processing of traffic flow sessions received at the input port operatively coupled to the router, the routing logic routing the at least one high priority traffic flow session to the accelerating logic and routing the plurality of low priority traffic flow to the output port bypassing the accelerating logic;
wherein the routing logic determines an amount of central processing unit resources available;
wherein the routing logic selectively routes a selected set of the plurality of low priority traffic flow sessions to the accelerating logic responsive to determining sufficient central processing unit resources are available to compress the selected set of the plurality of low priority traffic flow sessions as a set of compressed traffic flow sessions while there are sufficient central processing resources available to compress the selected set of the plurality of low priority traffic flow sessions;
wherein the routing logic is configured to determine a benefit result of the compression to the set of compressed traffic flow sessions; and,
wherein the routing logic is configured to selectively route a one of the set of compressed traffic flow sessions having a minimum benefit result to the output port bypassing the acceleration logic responsive to determinin there are insufficient central processing unit resources available to compress the set of compressed traffic flow sessions.

2. The apparatus of claim 1, wherein the selected one of the at least one low priority traffic flow sessions is re-routed from the accelerating logic to the output port bypassing the accelerating logic in response to the router logic determining the available central processing unit resources are no longer sufficient.

3. The apparatus of claim 1, wherein the available resource further comprises available bandwidth on an etherlink coupled to the output port.

4. The apparatus of claim 1 wherein the routing logic further determines how much memory is available;
   wherein the acceleration logic buffers and changes an advertised receiver window for the selected one of the at least one low priority traffic flow sessions while sufficient memory is available for providing buffering and changed advertised receiver window.

5. The apparatus of claim 1, wherein the routing logic further determines how much memory is available;
   wherein the acceleration logic uses acknowledgment (ACK) splitting for the selected one of the at least one low priority traffic flow sessions while sufficient memory is available for providing ACK splitting.

6. The apparatus of claim 1, further comprising:
   the router is configured for receiving a second low priority traffic flow session at the input port; and
   the routing logic is configured to route the second low priority traffic flow session based on available central processer unit resources being capable of processing both the selected one of the at least one low priority traffic flow sessions and the second low priority traffic flow session.

7. The apparatus of claim 1, further comprising:
   the router is configured for receiving a second high priority traffic flow session at the input port; and
   wherein the routing logic is configured to re-route the selected one of the at least one low priority flow sessions to the output port, bypassing the acceleration logic, responsive to receiving the second traffic flow session and determining that available central processing unit resources are insufficient to compress the selected one of the at least one low priority first traffic flow sessions and the second high priority traffic flow session.

8. The apparatus of claim 7, wherein the routing logic is further configured to selectively re-route the selected one of the at least one low priority traffic flow sessions to the acceleration logic responsive to the second high priority traffic flow session ending and the available central processing unit resources are sufficient to compress the selected one of the at least one low priority traffic flow sessions.

9. The apparatus set forth in claim 1, wherein the input receives at least one never accelerate traffic flow session;
   wherein the routing logic routes the never accelerate traffic flow session to the output port, bypassing the acceleration logic, while sufficient central processing unit resources are available to compress both the at least one high priority traffic flow session and the at least one never accelerate traffic flow session.

* * * * *